(12) United States Patent
Lamine

(10) Patent No.: US 10,450,228 B2
(45) Date of Patent: Oct. 22, 2019

(54) PROCESS FOR ACTIVATING A LAYER ON A GLASS SUBSTRATE

(71) Applicant: SAINT-GOBAIN GLASS FRANCE, Courbevoie (FR)

(72) Inventor: Driss Lamine, Antony (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 15/321,272

(22) PCT Filed: Jun. 17, 2015

(86) PCT No.: PCT/FR2015/051606
§ 371 (c)(1),
(2) Date: Dec. 22, 2016

(87) PCT Pub. No.: WO2015/197948
PCT Pub. Date: Dec. 30, 2015

(65) Prior Publication Data
US 2017/0158557 A1 Jun. 8, 2017

(30) Foreign Application Priority Data

Jun. 27, 2014 (FR) ..................................... 14 56054

(51) Int. Cl.
*B05D 5/06* (2006.01)
*C03C 23/00* (2006.01)
(Continued)

(52) U.S. Cl.
CPC .......... *C03C 23/007* (2013.01); *C03C 17/007* (2013.01); *C03C 17/23* (2013.01);
(Continued)

(58) Field of Classification Search
CPC ... C03C 23/007; C03C 17/3429; C03C 17/23; C03C 17/3644; C03C 17/366;
(Continued)

(56) References Cited

U.S. PATENT DOCUMENTS 5,073,181 A * 12/1991 Foster .................. C03B 40/033
427/154
2003/0092362 A1 5/2003 McCaffrey et al.
(Continued)

FOREIGN PATENT DOCUMENTS

DE 198 09 582 C1 8/1999
EP 0 940 372 A2 9/1999
(Continued)

OTHER PUBLICATIONS

Oscillate—https://www.merriam-webster.com/dictionary/oscillate (accessed Nov. 20, 2017).*
(Continued)

*Primary Examiner* — Michael P Wieczorek
*Assistant Examiner* — Michael G Miller
(74) *Attorney, Agent, or Firm* — Pillsbury Winthrop Shaw Pittman LLP

(57) ABSTRACT

A process for activating a layer supported by a glass substrate includes carrying out a heat treatment in a chamber of a stack of several examples of the glass substrate, the glass substrates being separated by an interlayer powder. The layer to be activated may be an ITO layer, or a titanium oxide layer, or an $SiO_2$ layer, or a silver layer.

28 Claims, 1 Drawing Sheet

Figure 1:
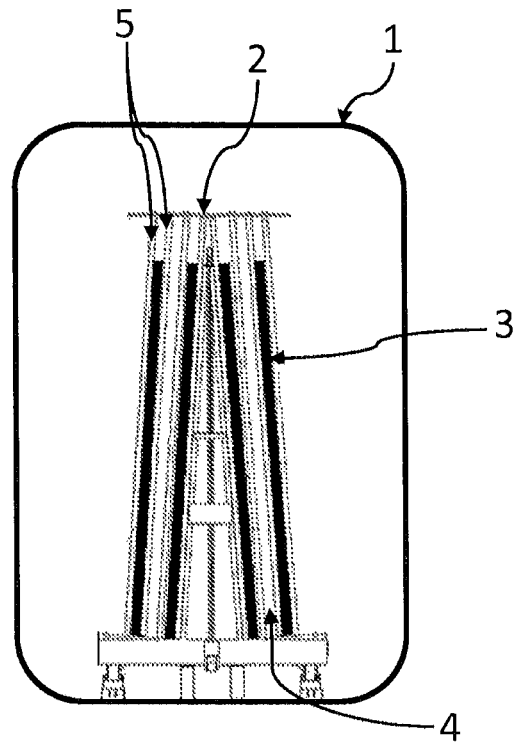

(51) Int. Cl.
*C03C 17/00* (2006.01)
*C03C 17/23* (2006.01)
*C03C 17/36* (2006.01)
*C03C 17/34* (2006.01)

(52) U.S. Cl.
CPC ........ *C03C 17/3429* (2013.01); *C03C 17/366* (2013.01); *C03C 17/3644* (2013.01); *C03C 2217/212* (2013.01); *C03C 2217/213* (2013.01); *C03C 2217/231* (2013.01); *C03C 2217/256* (2013.01); *C03C 2217/425* (2013.01); *C03C 2217/948* (2013.01); *C03C 2218/32* (2013.01)

(58) Field of Classification Search
CPC ............ C03C 17/007; C03C 2217/212; C03C 2217/231; C03C 2217/213; C03C 2217/256; C03C 2217/425; C03C 2217/948; C03C 2218/32
USPC .................................................. 427/162–169
See application file for complete search history.

(56) References Cited

U.S. PATENT DOCUMENTS

| | | | | |
|---|---|---|---|---|
| 2003/0168096 A1* | 9/2003 | Ouchida | ............... | C23C 14/086 136/256 |
| 2010/0189636 A1* | 7/2010 | Ikisawa | ................. | C04B 35/457 423/594.9 |
| 2012/0000247 A1* | 1/2012 | Burgard | ............... | B23K 26/362 65/29.12 |

| | | | |
|---|---|---|---|
| 2013/0320241 A1 | 12/2013 | Krasnov et al. | |

FOREIGN PATENT DOCUMENTS

| | | | | |
|---|---|---|---|---|
| JP | H02-248339 A | 10/1990 | | |
| JP | H10-297941 A | 11/1998 | | |
| JP | 2004-214541 A | 7/2004 | | |
| JP | 2007-511456 A | 5/2007 | | |
| WO | WO-0216280 A2 * | 2/2002 | ............. | C03B 23/02 |
| WO | WO 2012/022876 A2 | 2/2012 | | |
| WO | WO 2013/026817 A1 | 2/2013 | | |

OTHER PUBLICATIONS

International Search Report as issued in International Patent Application No. PCT/FR2015/051606, dated Sep. 24, 2015.
Search Report and Written Opinion as issued in French Patent Application No. 1456054, dated Mar. 31, 2015.
"Heat Soaking Process," Garibaldi Glass, Nov. 2012, Retrieved from the Internet: URL: <http://www.garibaldiglass.com/wp-content/uploads/2012/08/Heat-Soaking-PB0011.pdf>, retrieved on Mar. 27, 2015], 1 page.
Aberle, A.G., "Thin-film solar cells," Thin Solid Films, vol. 517, No. 17, Jul. 2009, pp. 4706-4710.
International Preliminary Report on Patentability and the Written Opinion of the International Searching Authority as issued in International Patent Application No. PCT/FR2015/051606, dated Dec. 27, 2016.
Notice of Allowance as issued in European Patent Application No. 15738723.4, dated Jan. 24, 2018.

* cited by examiner

PROCESS FOR ACTIVATING A LAYER ON A GLASS SUBSTRATE

CROSS-REFERENCE TO RELATED APPLICATIONS

This application is the U.S. National Stage of International Application Serial No. PCT/FR2015/051606, filed Jun. 17, 2015, which in turn claims priority to French Application No. 1456054, filed Jun. 27, 2014. The contents of all of these applications are incorporated herein by reference in their entirety.

The invention relates to a process for activating a layer deposited on a glass substrate, in particular a low-emissivity layer based on ITO or on silver or a self-cleaning layer.

Today, in order to heat layered glass, in particular of industrial size, for example having a size of at least 4 m², for example a substrate of 3 m×2 m size, at temperatures above 200° C. in order to give it its final properties, such as for example the photocatalytic activity of a self-cleaning layer or the low emissivity of an ITO or silver layer, and this without modifying, such as for example without tempering nor hardening the glass substrate supporting the layer, various heat treatment methods exist:

activation of the layer by a process based on laser or flash lamp technology; owing to the absorption of the radiation from the source, the layer may be heated without excessive heating of the glass substrate; this process may be carried out on-line at the end of the process for manufacturing the layer, for example after the deposition of the layer by magnetron sputtering; this process produces the following drawbacks:
  very high development cost for industrial sizes and significant technological risks;
  the treatment is homogeneous with difficulty, especially for the larger sizes of substrates, in particular greater than 15 m²; safety risks with respect to the personnel operating on the line due to the power of the radiation needed;
  the stack must be initially absorbent in the spectral range of the source, which may require the application of additional absorbent layers. Certain layers, in particular $SiO_2$ for an anti-reflection application, are transparent to laser radiation and cannot therefore be heated by this means;

activation of the layer by a more conventional heating process, by radiation and/or convection, by passing into a furnace that heats the glass substrate coated with the layer to be activated; each glass is heated separately one after the other such as for example in a tunnel furnace; this process produces the following drawbacks:
  the choice of the time/temperature pairing is in practice limited by the length of the furnace which introduces constraints for the activation of certain layers; by way of example, in order to activate a $TiO_2$ layer having a self-cleaning function at a temperature of 400° C., it is necessary to apply an annealing time of at least 30 minutes, which is much too long and unacceptable for a continuous furnace;
  high cost of the equipment, considering the peripheral elements needed (in the case of an off-line furnace, that is to say with intermediate storage of the substrates) or the long length of the furnaces in order to limit the risks of thermal breakages (in particular if the furnace is on-line, that is to say produced continuously following the deposition of the layer).

In these two types of process, the glass substrates supporting the layer to be activated run one after the other into a chamber that applies a treatment to each substrate one after the other. As prior art documents, mention may be made of WO 2013/026817 and US 2013/0320241. An ITO layer affected by the present invention is in particular described in EP 2 598 455.

The glass substrates comprise a sheet of glass and at least one layer to be activated, partially or completely covering at least one of its main faces. The invention relates more particularly to the glass substrates of large size, in particular having a main surface area of at least 4 m², or even of at least 10 m², or even of at least 15 m². Affected by the present invention are the glass substrates having the dimensions of those directly leaving flat glass manufacturing plants, in particular the panels referred to as jumbo panels (6000 mm×3210 mm) or lehr end size panels (3210 mm×2250 mm; 3210 mm×2200 mm; etc.). The term panel is often used to denote large-sized glass substrates or sheets of glass. The glass substrates to be activated may have a thickness within the range extending from 2 mm to 14 mm. The invention relates firstly to cut flat glass substrates.

The invention is based on the batch-mode use of a batch (off-line) chamber of modest size, in particular the internal volume of which is within the range extending from 20 to 200 m³, in which it is possible to place and heat at least one stack of glass substrates simultaneously, while being able to separately control the temperature and the time during which the glass is heated. At least one stack of glass substrates each coated with a layer to be activated is placed in a chamber, the various substrates of one and the same stack being separated by an interlayer powder that facilitates their separation (i.e. unstacking) after the heat treatment provided by the chamber.

The interlayer powder is compatible with this heat treatment and is chemically stable, in particular during storage in a warehouse. The interlayer powder may be based on $SiO_2$, in particular such as that sold under the brand SEPAROL DP. The interlayer powder may be based on $CaCO_3$, in particular such as that sold under the brand ESKAL. The interlayer powder may' be applied to the substrates by spraying with the aid of a powdering device. The interlayer powder advantageously has a D90 of less than 400 microns and preferably less than 200 microns. Thus, the interlayer powder is generally based on calcium carbonate or silicate, and has a D90 of less than 400 microns and preferably less than 200 microns.

Thus, the invention firstly relates to a process for activating a layer supported by a glass substrate comprising the heating in a chamber of a stack, generally of several stacks, of several examples of the glass substrate coated with a layer to be activated located on a main face of the glass substrate, where appropriate on both main faces of the glass substrate, said glass substrates being separated in one and the same stack by an interlayer powder. That which has just been stated covers the possibility that the substrate comprises several layers to be activated, said layers being found on the same face or being shared over both faces of the glass substrate, it being possible furthermore for a glass substrate to comprise layers to be activated of different nature. Owing to the process according to the invention, the layer to be activated is activated without the mechanical properties of the glass substrate being modified thereby. This means that the heat treatment does not modify in particular the values of stresses in the glass, nor its impact behavior. Generally, the glass substrates coated with the layer to be activated are not thermally tempered. The glass of the glass substrate is not generally thermally tempered. The layer to be activated is generally deposited by magnetron sputtering and the thermal activation according to the invention increases its crystalline nature.

It is possible to place in the chamber, for example, from 1 to 20 stacks of substrates. Each stack may comprise, for example, 2 to 30 coated glass substrates.

It is possible to place at least one stack in the chamber so that the glass substrates are horizontal. However, it is preferred to rest at least one stack in the chamber so that the glass substrates rest at least partly on their edge. In order to do this, it is possible to use a trestle-type support. In particular, the angle between a stack and the vertical may be within the range extending from 0 to 10° and preferably in the range extending from 2 to 4°.

Generally, the glass substrates coated with the layer to be activated are flat. The chamber is closed after placing the stack in the chamber and heat treatment is applied while the chamber is stationary, and generally, any stack in the chamber is also stationary.

The stacked glass substrates are heated in the chamber according to a temperature profile that comprises a temperature maximum. The temperature maximum is the highest temperature experienced by the glass substrate during the heat treatment. Where appropriate, this temperature maximum may be maintained at a hold of a certain duration, in particular at least 0.5 hour. The temperature maximum is below the strain point (lower annealing temperature) of the glass contained in the substrate. Thus, the heat treatment does not generate, in the glass sheet contained in the substrate, any undesirable irreversible deformation, and does not therefore modify its mechanical properties. A person skilled in the art knows how to measure the strain point of a glass, in particular by the bending method as described in the ASTM C598-93 standard. Generally, the temperature maximum may be below 495° C. and even below 450° C. The invention relates firstly to the glass substrates having glass which has a strain point above 495° C.

The heat treatment applies a temperature profile liable to activate the layer to be activated. The minimum temperature above which the substrate must be brought depends on the nature of the layer to be activated. The duration during which the substrate must be heated above a minimum temperature depends on the nature of the layer to be activated. The temperature maximum of the heat treatment is generally at least 200° C. and preferably generally at least 250° C., or even if necessary at least 300° C. The higher the temperature of the heat treatment, the shorter its duration. For example, a treatment of an ITO-based substrate of at least one hour at 350° C. is suitable. The properties of the layer are not modified for longer annealing times above the minimum temperature. In general, the glass substrate is heated for at least 0.5 hour and preferably at least 1 hour at a temperature of at least 200° C. and more generally of at least 300° C.

For the case where the layer to be activated is of ITO type (generally containing from 80% to 98% by weight of In oxide and 2% to 20% by weight of Sn oxide), the objective of the heat treatment is to crystallize the layer and to activate its dopant, which may in particular be Sn, so that the low-emissivity (low-e) function is conferred thereon. For this type of (ITO) layer, a heat treatment of the glass substrate above a minimum temperature of at least 300° C. and preferably of at least 350° C. is suitable. The temperature of the substrate is maintained above this minimum temperature for at least 0.5 h, in particular at least 2 h. For the activation of an ITO layer, the temperature maximum of the temperature profile may generally be below 400° C.

For the case where the layer to be activated is of self-cleaning type comprising titanium oxide, the objective of the heat treatment is the formation of the anatase phase within the layer. In this case, a heat treatment of the glass substrate above a minimum temperature of at least 350° C. and preferably at least 400° C. is suitable. The temperature of the substrate is maintained above this minimum temperature for at least 0.5 h, in particular at least 2 h.

The layer to be activated may also be a silica layer, in particular having an anti-reflection function. This anti-reflection function may in particular be provided owing to the insertion into the layer of an organic pore-forming material, which is discharged during the heat treatment according to the invention. The porosity thus produced in the layer is the source of the anti-reflection property. In this case, a heat treatment of the glass substrate above a minimum temperature of at least 300° C. and preferably of at least 350° C. is suitable. The temperature of the substrate is maintained above this minimum temperature for at least 0.5 h, in particular at least 2 h. By way of example, it is possible to carry out a rise in temperature from ambient temperature up to 400° C. over 9 hours, to observe a hold of 2 hours at 400° C., then to drop back down to ambient temperature over 9 h. This type of layer is advantageously deposited on both main faces of each substrate.

The layer to be activated may also be a silver layer, in particular having a low-emissivity function. A silver layer produced by sputtering needs to be heated in order to increase its crystalline nature and thus lower its emissivity. In this case, a heat treatment of the glass substrate above a minimum temperature of at least 250° C. and preferably of at least 300° C. is suitable. The temperature of the substrate is maintained above this minimum temperature for at least 0.5 h, in particular at least 2 h. Preferably, the temperature maximum is below 400° C.

During the application of the heat treatment in order to activate the layer, the chamber is generally closed. In the chamber, the heating is generally carried out by hot air convection. The air is generally subjected to an internal recycling in the chamber. It is preferable to carry out the rise in temperature from ambient temperature up to the temperature maximum, to observe a hold time at this temperature, and finally to drop the temperature from the temperature maximum back down to ambient temperature in a controlled manner. For this rise and this drop, it is possible to use, each time, a duration of between 5 and 20 hours, generally of the order of 10 hours. These long durations reduce the risks of thermomechanical breakages. There is a delay between the actual temperature of the glass within a stack and the temperature of the hot air surrounding this stack. This delay is of the order of 1 to 4 hours depending on the case. The hold time at the temperature maximum is thus determined so that all of the glasses have been brought to at least this temperature maximum for a minimum activation time, generally at least 0.5 hour.

In order to further reduce the risks of breakage, it is preferable to shape the edge of the substrates before the heat treatment, that is to say to rapidly pass an abrasive over their edges which also in particular rounds them a little. This shaping eliminates the defects that may act as crack initiation sites.

The glass substrate bearing the layer to be activated may also comprise at least one other layer, optionally to be activated. This other layer may be on the same face of the glass substrate as the layer to be activated or on its other face. This other layer may in particular be between the glass of the glass substrate and the layer to be activated. By way of example, in the case of a self-cleaning titanium oxide layer to be activated, it is possible to firstly deposit an $SiO_2$ layer on one main face of the glass, then the titanium oxide layer is deposited on the $SiO_2$ layer. In this case, the $SiO_2$ layer may in particular have a thickness of between 5 and 100 nm. The titanium oxide layer may have a thickness of between 1 and 100 nm.

The glass substrates may be stacked in order to form stacks, then these stacks may then be handled in the form of stacks with standard factory equipment and deposited on a support, in particular of trestle type, said support then being inserted into the heating chamber. Two neighboring stacks are preferably separated by a distance of at least one centimeter. This distance is useful for the proper circulation of the air between the stacks in order to heat all the glass substrates in the chamber more homogeneously. Thus, the distance between the stacks of substrates may be reduced or increased in order to find the right compromise between a high loading capacity and a high heating efficiency.

Advantageously, the stacks rest on a thermally insulating material, for example of glass fiber fabric type.

Preferably, temperature inhomogeneities in the glass, which may originate from the geometry of the trestle or heat transfers by the supports under the stacks, are avoided.

The method of heating in the chamber is of the convective air flow type in order to homogenize the temperatures at the surface of the substrates. This air flow may be either vertical or horizontal, and preferably has a direction perpendicular to the largest dimension of the glass.

When the heat treatment is finished, the substrates are removed from the chamber. They are then generally placed on another support, generally a trestle, in order to be transported or to again be stored.

The invention provides in particular the following advantages:
 reduced equipment costs,
 few technological risks,
 possibility of separately adjusting the heating temperature and heating time, in particular a hold time at the temperature maximum,
 requires little space in the factory.

For the purpose of reducing the energy cost of the process according to the invention, an energy recovery system may be installed in order to recover the heat during the cooling of the glass substrates.

Thus, the activation process according to the invention may take place according to the following procedure, after formation of flat glass, cut into panels, optional application of one or more layers on at least one main face of the glass sheets:
 optional shaping of the edges, then
 deposition of the layer to be activated, then
 application of the interlayer powder, then
 storage in stacks, then
 placement of the stacks in a chamber and activation according to the invention, then
 storage in stacks.

FIG. 1 shows a chamber 1 inside which a trestle 2 bearing several stacks 3 of glass substrates is positioned. A space 4 allows air to circulate between two neighboring stacks. The stacks are held in place owing to spacers 5 that allow the air to circulate.

Figure 2:
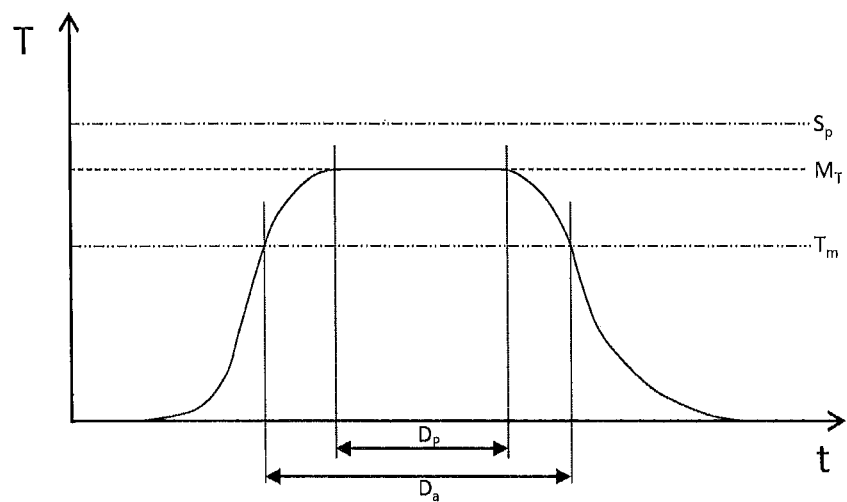

FIG. 2 gives an example of a temperature profile that may be applied to the stacked glass substrates. The temperature of a glass substrate is given on the y-axis and the time on the x-axis. The temperature Sp is the strain point, that is to say the lower annealing temperature that the temperature profile must not exceed in order to avoid modifying the mechanical properties of the glass. In this example, a temperature hold having a duration $D_p$ is applied at the temperature maximum $M_T$. The layer is essentially activated during the activation duration $D_a$, during which the substrate is above a minimum activation temperature $T_m$.

The invention claimed is:

1. A process for activating a layer supported by a glass substrate, the process comprising carrying out a heat treatment in a chamber of a stack of a plurality of said glass substrate coated with said layer, said glass substrates each coated with said layer being separated, in said stack, by an interlayer powder during said heat treatment.

2. The process as claimed in claim 1, wherein the stack comprises 3 to 30 glass substrates.

3. The process as claimed in claim 1, wherein the stack rests in the chamber at least partially on the edge of its substrates.

4. The process as claimed in claim 1, wherein the stack rests on a trestle.

5. The process as claimed in claim 1, wherein 1 to 20 stacks are placed in the chamber.

6. The process as claimed in claim 1, wherein a plurality of said stack are placed in the chamber, two neighboring stacks being separated from one another by a distance of at least 1 cm.

7. The process as claimed in claim 1, wherein during the heat treatment, the chamber is stationary and any stack in the chamber is stationary.

8. The process as claimed in claim 1, wherein the glass substrates are heated at a sufficiently low temperature so that the mechanical properties of a glass sheet of the glass substrate are not modified.

9. The process as claimed in claim 8, wherein stresses in the glass and the impact behavior of the glass substrate are not modified by the heat treatment.

10. The process as claimed in claim 1, wherein the glass of the glass substrate is not tempered.

11. The process as claimed in claim 1, wherein the heat treatment comprises a temperature maximum below the strain point of the glass contained in the substrate.

12. The process as claimed in claim 1, wherein the heat treatment comprises a temperature maximum below 495° C.

13. The process as claimed in claim 12, wherein the temperature maximum is at least 200° C.

14. The process as claimed in claim 13, wherein the glass substrate is heated for at least 0.5 hour at a temperature of at least 300° C.

15. The process as claimed in claim 1, wherein the layer to be activated is deposited by magnetron sputtering, the heat treatment increasing its crystalline nature.

16. The process as claimed in claim 1, wherein the layer to be activated is an ITO layer, or a titanium oxide layer, or an $SiO_2$ layer, or a silver layer.

17. The process as claimed in claim 1, wherein the heating is carried out by hot air convection in the chamber.

18. The process as claimed in claim 1, wherein the interlayer powder is based on calcium carbonate or silicate and has a D90 of less than 400 microns.

19. The process as claimed in claim 12, wherein the temperature maximum is below 450° C.

20. The process as claimed in claim 13, wherein the temperature maximum is at least 300° C.

21. The process as claimed in claim 14, wherein the glass substrate is heated for at least 1 hour at a temperature of at least 300° C.

22. The process as claimed in claim 18, wherein the D90 is less than 200 microns.

23. A process for activating a layer supported by a glass substrate comprising:
   depositing a layer to be activated on a main face of a first glass substrate;
   stacking a second glass substrate on said main face of the first glass substrate;
   wherein after said depositing and prior to stacking said second glass substrate, an interlayer powder is applied so as to provide said interlayer powder between said main face of the first glass substrate and the second glass substrate in order to separate said first glass substrate from said second glass substrate and to obtain a stack of the first and second glass substrates separated by the interlayer powder, and
   performing a heat treatment on the stack at a sufficiently low temperature so that the mechanical properties of a glass sheet of each of the first and second glass substrate are not modified.

24. The process as claimed in claim 23, wherein the interlayer powder is sprayed on said first glass substrate.

25. The process as claimed in claim 23, wherein the layer to be activated is deposited on the entire main face of the first glass substrate.

26. The process as claimed in claim 23, wherein the first and second glass substrates are stacked horizontally during said heat treatment.

27. The process as claimed in claim 1, wherein the interlayer powder includes micron size particles and has a D90 of less than 400 microns.

28. The process as claimed in claim 23, wherein the interlayer powder includes micron size particles and has a D90 of less than 400 microns.

* * * * *